(12) United States Patent
Kormann

(10) Patent No.: US 7,861,606 B2
(45) Date of Patent: Jan. 4, 2011

(54) MEASURING ARRANGEMENT FOR DETERMINING THE CONSTITUENTS OF A SAMPLE TAKEN FROM A CROP STREAM

(75) Inventor: Georg Kormann, Zweibrucken (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/463,487

(22) Filed: May 11, 2009

(65) Prior Publication Data

US 2009/0286582 A1 Nov. 19, 2009

(30) Foreign Application Priority Data

May 15, 2008 (DE) .................... 10 2008 001 783

(51) Int. Cl.
*G01D 1/00* (2006.01)
*G01L 1/06* (2006.01)

(52) U.S. Cl. ............... 73/863.53; 73/863.52; 73/863; 460/7

(58) Field of Classification Search ............ 460/1, 460/6, 7, 114, 119, 97, 106; 56/14.6, 10.2 B, 56/10.2 R; 73/863, 52, 863.85, 863.57, 863.53; 324/452, 664; 702/129, 2, 101; 250/339.11, 250/339.12, 339.07; 356/36, 73, 326, 328
See application file for complete search history.

(56) References Cited

U.S. PATENT DOCUMENTS

| | | | | |
|---|---|---|---|---|
| 3,270,279 | A * | 8/1966 | Jackson et al. .............. | 324/689 |
| 4,403,191 | A * | 9/1983 | Satake .......................... | 324/452 |
| 4,640,614 | A * | 2/1987 | Roberts et al. ................ | 356/36 |
| 4,663,978 | A * | 5/1987 | Lenski et al. ............. | 73/863.52 |
| 5,092,819 | A * | 3/1992 | Schroeder et al. ............... | 460/7 |
| 5,173,079 | A * | 12/1992 | Gerrish ........................... | 460/7 |
| 5,327,708 | A * | 7/1994 | Gerrish ........................... | 56/1 |
| 5,518,454 | A * | 5/1996 | Twilley et al. ................. | 460/7 |
| 5,751,421 | A | 5/1998 | Wright et al. | |
| 5,957,773 | A * | 9/1999 | Olmsted et al. ................ | 460/7 |
| 5,991,025 | A | 11/1999 | Wright et al. | |
| 6,100,526 | A | 8/2000 | Mayes | |
| 6,155,103 | A * | 12/2000 | Diekhans et al. ............... | 73/73 |
| 6,327,899 | B1 * | 12/2001 | Diekhans et al. ............... | 73/73 |
| 6,791,683 | B2 * | 9/2004 | Sjodin ........................ | 356/326 |
| 6,845,326 | B1 * | 1/2005 | Panigrahi et al. .............. | 702/22 |
| 6,926,603 | B2 * | 8/2005 | Kormann et al. ............... | 460/1 |
| 7,077,743 | B2 * | 7/2006 | Quincke et al. ................ | 460/7 |
| 7,169,040 | B2 * | 1/2007 | Kormann et al. ............... | 460/7 |
| 7,343,262 | B2 * | 3/2008 | Baumgarten et al. ........ | 702/129 |
| 7,503,160 | B2 | 3/2009 | Degen et al. | |
| 7,508,501 | B2 * | 3/2009 | Zubkov et al. ................. | 356/73 |
| 7,618,311 | B2 * | 11/2009 | Diekhans ........................ | 460/7 |
| 2007/0186530 | A1 * | 8/2007 | Meier et al. ................... | 56/14.6 |

FOREIGN PATENT DOCUMENTS

| | | |
|---|---|---|
| DE | 3249175 | 11/1983 |
| DE | 19922867 | 11/2000 |
| DE | 10236515 | 9/2003 |
| EP | 1825740 | 8/2007 |

* cited by examiner

*Primary Examiner*—Árpád Fábián-Kovács

(57) ABSTRACT

A measuring arrangement is associated with a branch channel of a channel through which crops flow. The measuring arrangement comprises a measuring device for detecting the constituents of a sample of a crop stream in the branch channel, where in the branch channel between an opening and the measuring device, a processing device is arranged for reducing in size or for squeezing the sample.

15 Claims, 2 Drawing Sheets

MEASURING ARRANGEMENT FOR DETERMINING THE CONSTITUENTS OF A SAMPLE TAKEN FROM A CROP STREAM

FIELD OF THE INVENTION

The invention relates to a measuring arrangement for determining the constituents of a sample taken from a crop stream.

BACKGROUND ART

When harvesting plants which are cultivated agriculturally, in many cases it is useful to obtain detailed information about the constituents and other properties of the plants. It has been proposed, therefore, to arrange a suitable measuring device in the vicinity of the crop stream, which irradiates said crop stream with broadband light in the visible wave range or in the near infrared range and identifies the constituents using the spectra of the reflected light. In combine harvesters, the measuring device may be arranged on the grain tank filling worm and may directly cooperate with the conveyed grain flow (e.g., U.S. Pat. No. 6,100,526) or a portion of the grain flow is diverted and guided into a measuring chamber, with which the measuring device is associated (e.g., U.S. Pat. No. 5,751,421). In forage harvesters, the measuring device is generally attached to the discharge device for the chopped crops (e.g., DE 199 22 867 A). In a forage harvester, it has also been proposed to divert a proportion of the chopped crop stream and to guide it past a measuring device by means of a conveyor device (e.g., DE 102 36 515 C and U.S. Pat. No. 5,991,025).

The sample is generally chopped before laboratory analysis of the fodder, carried out by near infrared measuring devices (DE 32 49 175 T).

A potential drawback in certain existing measuring devices is that with larger crop particles and/or cut lengths, the greatest proportion of the measured values is obtained on uncut, and often even on soiled, surfaces of the material so that no meaningful information is obtained about the constituents. Moreover, with larger crop particles or cut lengths, voids may be formed in the samples which also result in unusable spectra and measured values, or a less representative material stream is taken as large particles do not enter the sampling device. Moreover, with large crop particles, the risk increases of blocking the sampling device.

SUMMARY

A measuring arrangement is associated with a branch channel of a channel through which crops flow. The measuring arrangement comprises a measuring device for detecting the constituents of a sample of a crop stream in the branch channel, where in the branch channel between an opening and the measuring device, a processing device is arranged for reducing in size or for squeezing the sample.

DETAILED DESCRIPTION OF THE PREFERRED EMBODIMENT(S)

The measuring arrangement comprises a branch channel which extends between an opening of a channel conveying crops and a measuring device which is used for determining the constituents of the sample of crops contained in the branch channel. Between the opening to the channel and the measuring device a processing device is attached. The sample is prepared by the processing device such that the measuring device produces improved or optimized spectra, by means of which the constituents may be reliably detected. In detail, the processing device may crush or squeeze and/or reduce in size, in particular chop, break-up or mill, the sample.

In a preferred embodiment of the invention, the measuring device is connected to a computer. The computer determines using the measured values of the measuring device, in particular the spectra, whether or not the quality of the measured values is sufficient. Moreover, the computer is connected to an actuator which in turn controls the degree of effectiveness of the processing device on the sample. If the spectra, for example, indicate that to a large extent only unprocessed (unchopped or the like) surfaces of the sample have been detected or that the sample contains larger voids, the computer may increase the degree of effectiveness of the processing device and, for example, reduce the cut length produced by the processing device or grain sizes achieved during milling, or increase the squeezing force. In order to prevent the sample through-flow from being unnecessarily low, however, the degree of processing is preferably selected by the computer only to be sufficiently great for appropriate measured values to be carried out, but not greater than required.

The invention may be used on any harvesting machine in which crops flow through a channel. Examples are combine harvesters, in which the channel receives cleaned corn or crop remains, or forage harvesters in which chopped crops flow through the channel.

Figure 1:
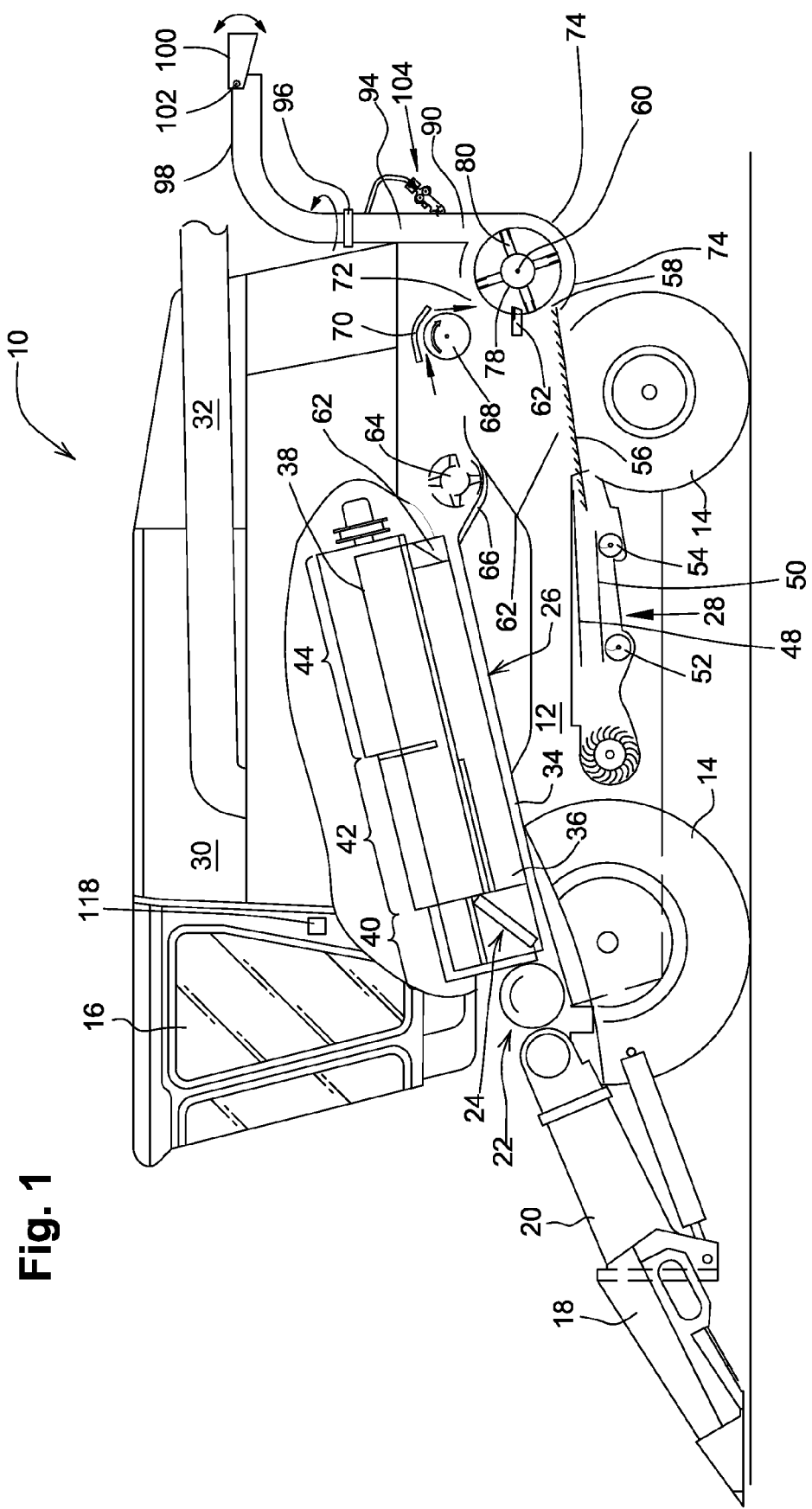
FIG. 1 shows a partially sectioned lateral view of a combine harvester with a measuring arrangement for determining the constituents of a sample taken from a crop stream.

FIG. 1 shows an agricultural combine harvester 10 comprising a chassis 12 with wheels 14 in engagement with the ground, which are fastened to the chassis 12 and serve to move the combine harvester 10 in a forward direction which runs to the left in FIG. 1. The operation of the combine harvester 10 is controlled from the operator cab 16. A maize picker 18 is used in order to separate the cobs from maize plants on the field and to supply them to a slope conveyor 20, whilst the stalks are separated by stalk choppers arranged on the underside of the maize picker 18 and distributed on the field. The crops (i.e. the harvested cobs) are fed by the slope conveyor 20 to a guide drum 22. The guide drum 22 conveys the crops through an inlet transition portion 24 to an axial crop processing device 26. Directional information provided hereinafter, such as "to the front" and "to the rear", relates to the forward direction of the combine harvester 10 which in FIG. 1 runs to the left.

The crop processing device 26 comprises a rotor housing 34 and a rotor 36 arranged therein, which has a hollow drum 38, which is divided up into a loading portion 40, a threshing portion 42 and a separating portion 44.

Instead of an axial crop processing unit 26, a tangential threshing drum and a subsequent axial separating device or straw shaker may also be used.

Grains and smaller crop components which fall through a threshing basket associated with the threshing portion and a separating grate associated with the separating portion 44, are supplied to a cleaning system 28 by a fan 46 and into lamellar sifters 48, 50 which may be set into oscillating motion. The cleaning system 28 removes the smaller components and passes the clean grains via a worm conveyor 52 to an elevator (not shown). The elevator deposits the clean grains in a grain tank 30. The grains in the grain tank 30 may be unloaded by an unloading worm conveyor 32 to a grain cart, trailer or heavy goods vehicle. At the rear end of the lower lamellar sifter 50 remaining crops are fed back to the crop processing device 26 by means of a worm conveyor 54 and a tailings conveyor (not shown). The crop remains deposited at the rear end of the upper lamellar sifter 48, which substantially consist of small crop components, are conveyed by an oscillating bottom conveyor 56 to the rear into a lower inlet 58 of a straw cutter 60.

Threshed crop remains leaving the separating portion 44 (mostly husks, stalks, leaves and cobs) are ejected through an outlet 62 from the crop processing device 26 and fed to an ejection drum 64. The ejection drum 64 cooperating with a floor 66 arranged thereunder ejects the crop remains to the rear. To the rear of the ejection drum 64 is located a drum conveyor 68 which diverts crop remains in cooperation with an upper guide floor 70 downward into an upper inlet 72 of the straw chopper 60.

The straw chopper 60 is made up of a housing 74 and a rotor 78 arranged therein and which may be rotated about an axis extending horizontally and transversely to the forward direction, with chopping blades 80 distributed over the periphery of the rotor 78 and suspended in an oscillating manner in pairs, which cooperate with counter blades 62 fixed to the housing. The housing 74 has in its upper rear region an opening 90, above which a channel 94 extending vertically follows, and at the upper side thereof an ejection elbow 98 follows. The channel 94 narrows upwardly and terminates in a rotating assembly 96. The ejection elbow 98 with a discharge flap 100 at the end which is movable about a horizontal axis 102 is attached to the rotating assembly 96 which is rotatable about the vertical axis. The rotations of the rotating assembly 96 about the vertical axis and that of the discharge flap 100 about its horizontal axis 102 are carried out by suitable actuators (not shown) actuated by an external force, in particular electric motors or hydraulic motors and/or hydraulic cylinders controlled from the operator cab 16, in order to guide the crop remains to a trailer or a different transport vehicle, which is pulled behind the combine harvester 10.

Figure 2:
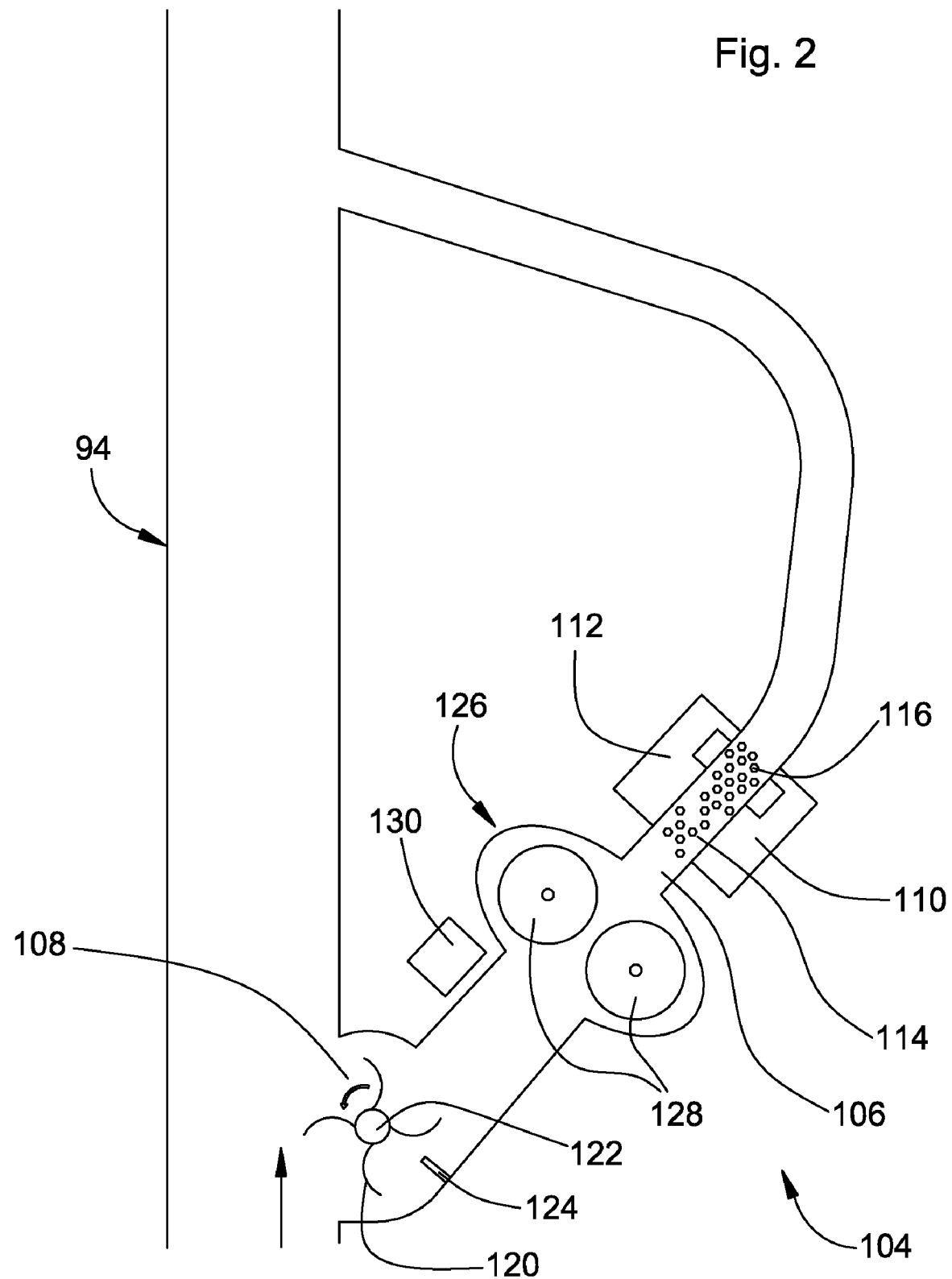
FIG. 2 shows an enlarged lateral view of the measuring arrangement of FIG. 1.

The crop remains flow through the channel 94 during the harvesting operation. In order to detect the constituents of these materials which are generally used for generating bioenergy or as cattle fodder, a measuring arrangement 104 is associated with the channel 94, which is shown in more detail in FIG. 2. The measuring arrangement 104 comprises a branch channel 106 which emerges from an opening 108 in the channel 94, and on which are arranged two measuring devices 110, 112. A first measuring device 110 comprises a near infrared spectrometer, preferably without movable optical elements, which is provided with a broadband light source which irradiates a sample 116 contained in the branch channel 106 through a transparent window 114, and an analyzer, which spectrally disperses light reflected from the sample 116 through a dispersive element (for example a grid or prism) and diverts the light in different directions, whilst a detector detects the intensity of the dispersed light in a specific location. To this end, reference is made to the disclosure of DE 199 22 867 A. The measuring device 110 is connected to a computer 118 which, using the detected spectra, detects the constituents of the sample 116 and preferably records the constituents by geo-referencing. The second measuring device 112 is a camera, similarly connected to the computer 118, by means of which the granulometric properties of the sample 116 may be detected.

In the region of the opening 108, a conveying device 120 is arranged with curved conveyor forks arranged in succession counter to the rotational direction on a rotatable shaft 122 and which during the rotation of the shaft 122 project into the channel 94, in order to remove the sample 116 from the actual crop stream and to reduce the sample in size in cooperation with the stationary counter blades 124 projecting into the branch channel 106 and distributed over the width thereof. The counter blades 124 could possibly also be dispensed with. Downstream of the conveying device 120 a processing device 126 follows which has two rollers 128 which serve to grind the sample 116. The spacing of the rollers 128 and thus the grain size achieved, is able to be adjusted by means of an actuator 130 connected to the computer 118, and which may be an electric motor. The rollers 128 could also be used for squeezing the sample 116, in the manner of a grain processor known per se on a forage harvester or they could be replaced by a chopping device. Downstream of the measuring devices 110, 112, the branch channel 106 passes the sample 116 back into the channel 94. For improving the transport of the sample 116, a further conveyor device could be provided at this point. It might also be conceivable to attach a diverter downstream of the measuring devices, by means of which the sample 116 is, if required, passed back into the channel 94, conducted into a sample container (not shown) or directly guided onto the field. It might also be possible to convey the sample 116 back to the measuring device 110 in order to increase the detected surface area.

Accordingly, during the harvesting operation, spectra of the sample 116 are regularly detected by the measuring device 110 and the corresponding constituents calculated by the computer 118 and recorded by geo-referencing. Using the spectra and/or the images of the second measuring device 112, the computer 118 identifies whether the degree of size reduction of the sample 116 is sufficient, in order to ensure that sufficiently few voids are contained in the sample 116 and/or a sufficiently large proportion of the spectra have been detected using broken-up samples 116 (and not only using the surface area of uncut samples 116). If this proportion is not achieved, the computer 118 triggers the actuator 130 to increase the degree of effectiveness of the processing device 126 but respectively only to a degree of size reduction which is sufficient to keep the processing speed sufficiently high and equally the measuring time short.

The counter blades 124 and, in particular, the processing device 126 have the advantage that even with relatively large crop particles in the channel 94 an efficient detection, in terms of quality, of the constituents of the sample 116 is permitted. The large crop particles are reduced in size and/or squeezed by the counter blades 124 and the processing device 126, so that the sample 116 in milled, pulverized or fluid form passes in front of the measuring device 110. By detecting the quality of the measured values of the measuring device 110, the computer 118 also identifies when more or less processing of the sample 116 is required by the processing device 126 and this is automatically carried out by means of the actuator 130.

Having described the preferred embodiment, it will become apparent that various modifications can be made without departing from the scope of the invention as defined in the accompanying claims.

The invention claimed is:

1. A measuring arrangement for determining the constituents of a sample taken from a crop stream, the measuring arrangement comprising:
   a branch channel connected to an opening in a channel through which crops may flow;
   a measuring device associated with the branch channel to detect the constituents of the sample contained in the branch channel and taken from the crop stream, the measuring device capable of irradiating the crop stream with light or near infrared range radiation and measuring spectra of reflected light; and in the branch channel between the opening and the measuring device, a processing device is arranged for reducing the sample in size, by squeezing and chopping the sample, where the size reduction of the sample by the processing device is adjusted based on the measured spectra of the reflected light.

2. The measuring arrangement as claimed in claim 1, wherein the processing device is designed for breaking up milling the sample.

3. The measuring arrangement as claimed in claim 2, wherein the measuring device is connected to a computer operated to control the degree of effectiveness of the milling of the processing device on the sample by adjusting grain size within the sample achieved during the milling.

4. The measuring arrangement as claimed in claim 3, wherein the computer operated to monitor the degree of effectiveness of the processing device on the sample based on measured values obtained by the measuring device.

5. The measuring arrangement as claimed in claim 1, which has a conveying device arranged in the region of the opening by means of which the sample is conveyed into the branch channel.

6. The measuring arrangement as claimed in claim 5, wherein the conveying device cooperates with fixed counter blades.

7. An agricultural harvesting machine comprising:
a branch channel connected to an opening in another channel through which crops may flow;
a measuring device associated with the branch channel for detecting the constituents of the sample contained in the branch channel and taken from the crop stream, the measuring device capable of irradiating the crop stream with light or near infrared range radiation and measuring spectra of reflected light; and
in the branch channel between the opening and the measuring device, a processing device is arranged for reducing in size the sample or particles within the sample, by squeezing and chopping the sample, where the size reduction of the sample is adjusted based on the measured spectra of the reflected light.

8. The measuring arrangement according to claim 7 wherein the processing device is designed for breaking up or milling the sample.

9. The measuring arrangement according to claim 8 wherein the measuring device is connected to a computer operated to control the degree of effectiveness of the milling of the processing device on the sample by adjusting grain size achieved during the milling.

10. The measuring arrangement according to claim 9 wherein the computer is operated to monitor the degree of effectiveness of the processing device on the sample based on measured values obtained by the measuring device.

11. The measuring arrangement according to claim 7 which has a conveying device arranged in the region of the opening by means of which the sample is conveyed into the branch channel.

12. The measuring arrangement according to claim 11 wherein the conveying device cooperates with fixed counter blades.

13. A measuring arrangement for determining the constituents of a sample taken from a crop stream, the measuring arrangement comprising:
a branch channel connected to an opening in a channel through which crops may flow;
a measuring device associated with the branch channel for detecting the constituents of the sample contained in the branch channel and taken from the crop stream, the measuring device capable of irradiating the crop stream with light or near infrared range radiation and measuring spectra of reflected light; and
in the branch channel between the opening and the measuring device, a processing device is arranged for reducing the sample or particles within the sample in size, by squeezing and grinding the sample, where the size reduction of the sample is adjusted based on the measured spectra of the reflected light.

14. The measuring arrangement according to claim 13 wherein the processing device is designed for milling the sample.

15. The measuring arrangement according to claim 14 wherein the measuring device is connected to a computer which may be operated to control the degree of effectiveness of the milling of the processing device on the sample by adjusting grain size within the sample achieved during the milling.

\* \* \* \* \*